United States Patent [19]
Auxier et al.

[11] Patent Number: 5,392,515
[45] Date of Patent: Feb. 28, 1995

[54] METHOD OF MANUFACTURING AN AIR COOLED VANE WITH FILM COOLING POCKET CONSTRUCTION

[75] Inventors: Thomas A. Auxier, Palm Beach Gardens; Hans R. Przirembel, Jupiter; Friedrich O. Soechting, Tequesta, all of Fla.

[73] Assignee: United Technologies Corporation, Hartford, Conn.

[21] Appl. No.: 842,289

[22] Filed: Feb. 10, 1992

Related U.S. Application Data

[62] Division of Ser. No. 550,008, Jul. 9, 1990.

[51] Int. Cl.6 .............................................. B23P 15/00
[52] U.S. Cl. ............................. 29/889.721; 29/889.72; 29/463; 415/115; 415/116; 416/96 A; 416/97 R
[58] Field of Search ............. 29/889.72, 889.721, 29/889.722, 463; 415/115, 116; 416/96 A, 97 R

[56] References Cited

U.S. PATENT DOCUMENTS

| | | | |
|---|---|---|---|
| 4,168,938 | 9/1979 | Dodd | 415/115 |
| 4,286,924 | 9/1981 | Gale | 415/115 |
| 4,417,381 | 11/1983 | Higginbotham | 29/889.721 |
| 4,672,727 | 6/1987 | Field | 29/889.721 |
| 4,726,735 | 2/1988 | Field et al. | 415/115 |
| 4,738,588 | 4/1988 | Field | 415/115 |
| 4,827,587 | 5/1989 | Hall et al. | 29/889.721 |
| 4,859,147 | 8/1989 | Hall et al. | 415/115 |

FOREIGN PATENT DOCUMENTS

1584527  12/1969  France ........................ 29/889.722

*Primary Examiner*—Harold J. Tudor
*Attorney, Agent, or Firm*—Norman Friedland

[57] ABSTRACT

An air cooled stator vane for a gas turbine engine is fabricated by casting the suction side wall and pressure side wall of the airfoil into separate halves and joining both halves at complementary sides and ribs, and forming pockets with a slot at the end of each pocket for flowing a film of cooling air over the exterior wall and drilling holes in the end of the pocket remote from the slot to fluidly connect the pocket with cooling air. The method includes in another embodiment a sheet metal sheath with pockets and slots identical to the pockets and slots in the shell configuration formed over the shell. Another embodiment includes perforated inserts extending in the cavity formed by the shell.

4 Claims, 7 Drawing Sheets

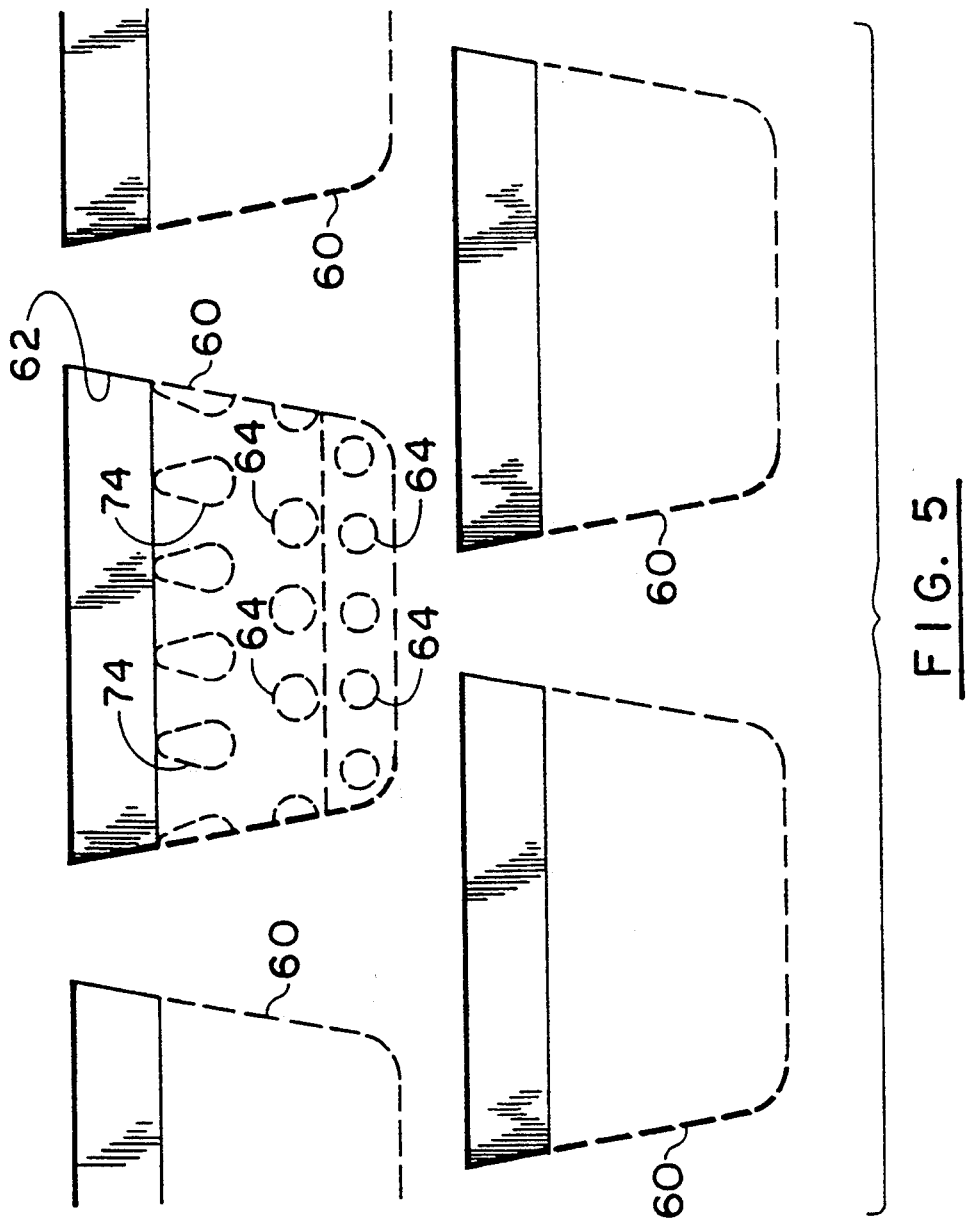

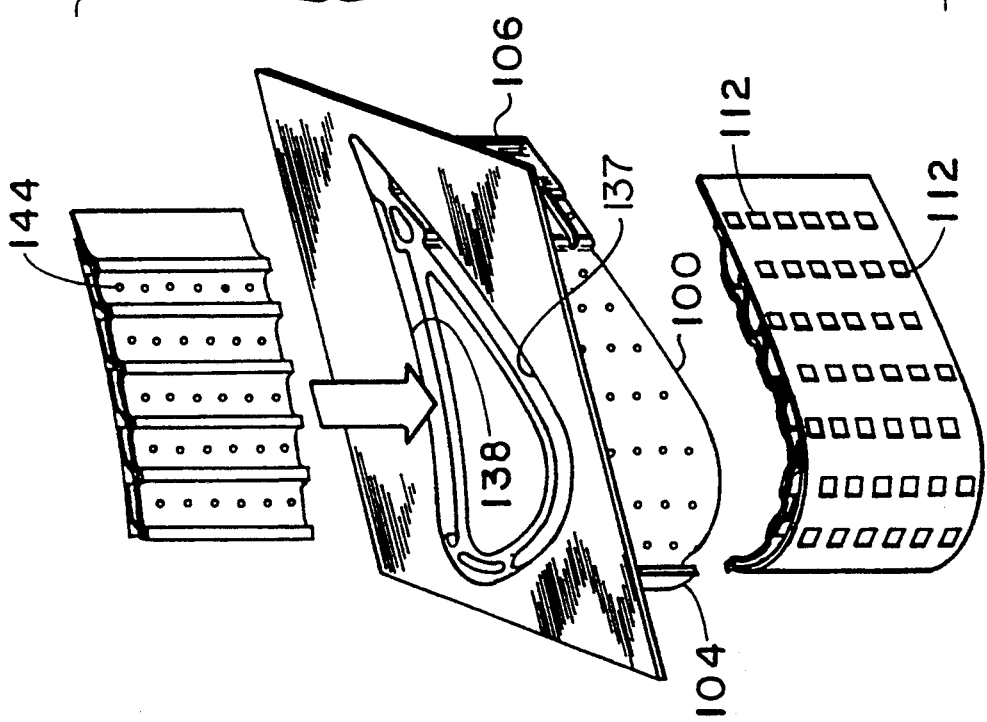
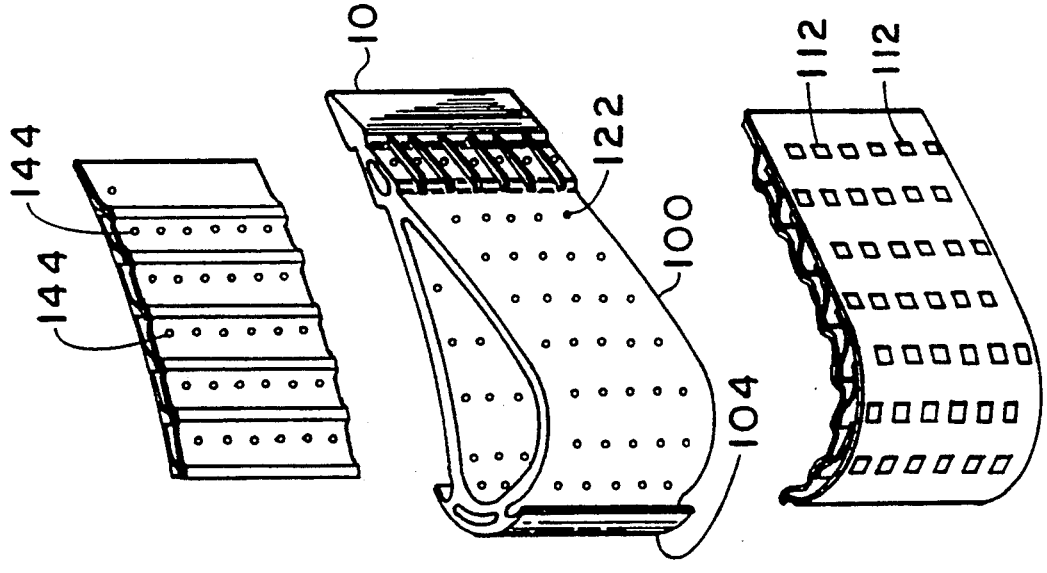

METHOD OF MANUFACTURING AN AIR COOLED VANE WITH FILM COOLING POCKET CONSTRUCTION

The invention was made under a U.S. Government contract and the Government has rights herein.

This is a division of copending application Ser. No. 07/550,008, filed on Jul. 9, 1990.

CROSS REFERENCE

The subject matter of this application is related to the subject matter of commonly assigned U.S. patent application Ser. No. 07/550,003 filed on even date herewith and entitled "Cooled Vane".

TECHNICAL FIELD

This invention relates to gas turbine engines and more particularly to the cooling aspects of the vane and other stator components.

BACKGROUND ART

The technical community working in gas turbine engine technology have and are continually expending considerable effort to improve the cooling aspects of the engine's component parts, particularly in the turbine area. Obviously, improving the effectiveness of the cooling air results in either utilizing less air for cooling or operating the engine at higher temperature. Either situation attributes to an improvement in the performance of the engine.

It is axiomatic that notwithstanding the enormous results and development that has occurred over the years the state-of-the-art of film cooling and convection techniques are not optimum.

Some of the problems that adversely affect the cooling aspects particularly in vanes are (1) the pressure ratio across all of the film holes cannot be optimized and (2) in vanes that incorporate conventional inserts, the static pressure downstream of the insert is substantially constant. Essentially in item (1) above the holes that operate with less than optimum pressure drop fail to produce optimum film cooling and in item (2) above a constant stator pressure adversely affects internal convection.

One of the techniques that has been used with some degree of success is coating of the airfoil sections of the vanes with a well known thermal barrier coating. However, a coated vane conventionally requires drilling the film coating hole after the coating process by a laser which typically results in a cylindrical hole compromising the film cooling effectiveness, thus consequently reducing the effectiveness of the coating. Moreover, flow control through the laser hole is more difficult, presenting additional problems to the engine designer.

We have found that we can obviate the problems noted above and improve the cooling effectiveness by providing in the vane a plurality of pockets that form metering slots on the airfoil surface together with judiciously located holes associated with each pocket for feeding cooling air to the metering slots which, in turn, effectively coalesce the air into a film of cooling air that flows across the external surface of the vane. The passageway from these located holes to the inclined slots places the cooling air in indirect parallel flow heat exchange relation with the gas path.

It is contemplated within the scope of this invention that the vane be fabricated from either a total casting process or a partial casting process where a structural inner shell is cast and a sheath formed from sheet metal encapsulates the shell.

A vane constructed in accordance with this invention affords amongst other advantages the following:

1) Film cooling effectiveness is optimized.

2) The film cooling system can adapt to thermal barrier coatings and the like without film cooling compromise.

3) Convection is optimized since flow can be metered locally to heat-transfer requirements and overall pressure ratio.

4) In the sheet metal design a repair procedure can be accommodated where distressed panels can be replaced without scrapping the total part.

5) A pressure side or suction side panel of the sheet metal designed vane may be optimized for flow and film coverage.

6) Improved cooling is achieved with hole and slot sizes that are large enough to minimize internal plugging.

7) In the sheet metal configuration flexibility of material choices for the external shell is significantly increased.

8) In the fully cast configuration the vane can be cast in halves which offer the most versatility in terms of achieving desired cooling flows and film blowing parameters.

SUMMARY OF THE INVENTION

An object of this invention is to provide for a gas turbine engine improved cooling effectiveness for the engine's vanes and/or stator components.

A feature of this invention is to provide side walls that define the airfoil section of a vane having a plurality of pockets each having a metered slot for flowing film cooling air on the outer surface of the side wall and having judiciously located holes discretely feeding cooling air into said pockets from a central passageway in the vane communicating with a source of cooling air. The airfoil surface in one embodiment is formed from sheet metal supported to an inner cast shell and in another embodiment the vane including the airfoil section is fully cast. Still another embodiment employs a double layer of stamped sheet metal forming a 2-layer inner configuration. And still another embodiment includes a fully cast vane including pockets with judiciously located holes as previously described, but also including inserts having a plurality of apertures for feeding cooling air from the central passageway to the judiciously located holes.

The foregoing and other features and advantages of the present invention will become more apparent from the following description and accompanying drawings.

BRIEF DESCRIPTION OF THE DRAWINGS

FIG. 5 is an enlarged view showing a portion of the pressure surface of the airfoil section of the vane in FIG. 3.

FIG. 11 is an exploded view in perspective of the embodiment depicted in FIG. 7.

FIG. 12 is an exploded view identical to FIG. 11 but including the platform.

BEST MODE FOR CARRYING OUT THE INVENTION

While in its preferred embodiment this invention is being utilized in the stator vane of the first turbine of a gas turbine engine, it will be understood by those skilled in this technology that the invention can be employed in other vanes and other static components without departing from the scope of this invention. Notwithstanding the fact that the preferred embodiment is a fully cast vane utilizing inserts, the partially cast embodiment or fully cast embodiment without inserts are all deemed to be within the scope of this invention.

Figure 1:
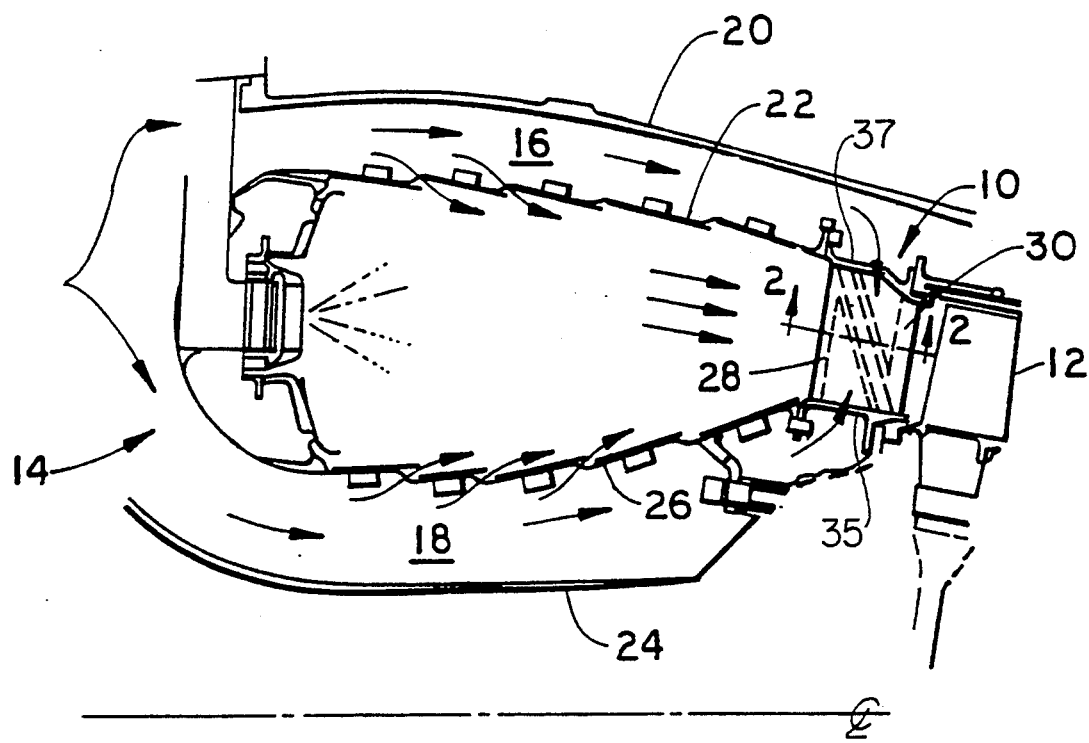
FIG. 1 is a partial view in schematic of the combustor, 1st turbine and vane of a gas turbine engine exemplary of the prior art.
Figure 2:
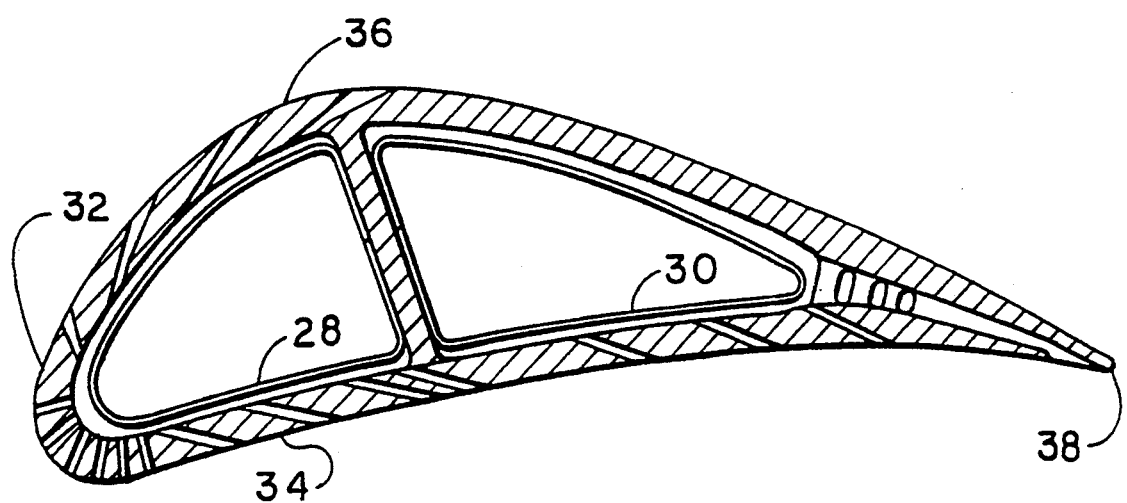
FIG. 2 is a sectional view taken along lines 2—2 of FIG. 1 of a prior art vane.

The invention can perhaps be best understood by first having an understanding of the state-of-the-art vane exemplified by the prior art disclosed in FIGS. 1 and 2. As shown the vane generally indicated by reference numeral 10 is disposed between the turbine 12 and burner 14. The vane 10 is cooled by routing cool air obtained from the engine's compressor section (not shown) via the passageways 16 and 18 which is defined by the outer annular case 20 and outer liner 22 and inner annular case 24 and inner annular burner liner 26. Inserts 28 and 30 opened at its base distribute the cool air from passageways 16 and 18 through a plurality of holes formed in the walls thereof to a plurality of holes formed in the pressure surface, suction surface, trailing and leading edges. Typically, flow entering the insert or impingement tube circuit 28 from passageway 18 exits the vane as film air through film holes in the leading edge 32, the pressure surface 34 and the suction surface 36. Flow entering the insert or impingement tube circuit 30 from passageway 16 exits the vane as film air through film holes in the pressure surface 34 and suction surface 36 and as dump flow through holes in the trailing edge 38. Platforms 35 and 37 on the inner and outside diameter serve to attach the vane to the engine's turbine and combustor cases and are opened to the compressor air flow.

What has been described is conventional in available gas turbine engines such as the JT9D, PW2037, PW4000 and F100 family of engines manufactured by Pratt and Whitney division of United Technologies Corporation, the assignee common with this patent application. For the sake of convenience and simplicity only that portion germane to the invention is described herein, and for further details the above noted engines are incorporated herein by reference.

Figure 3:
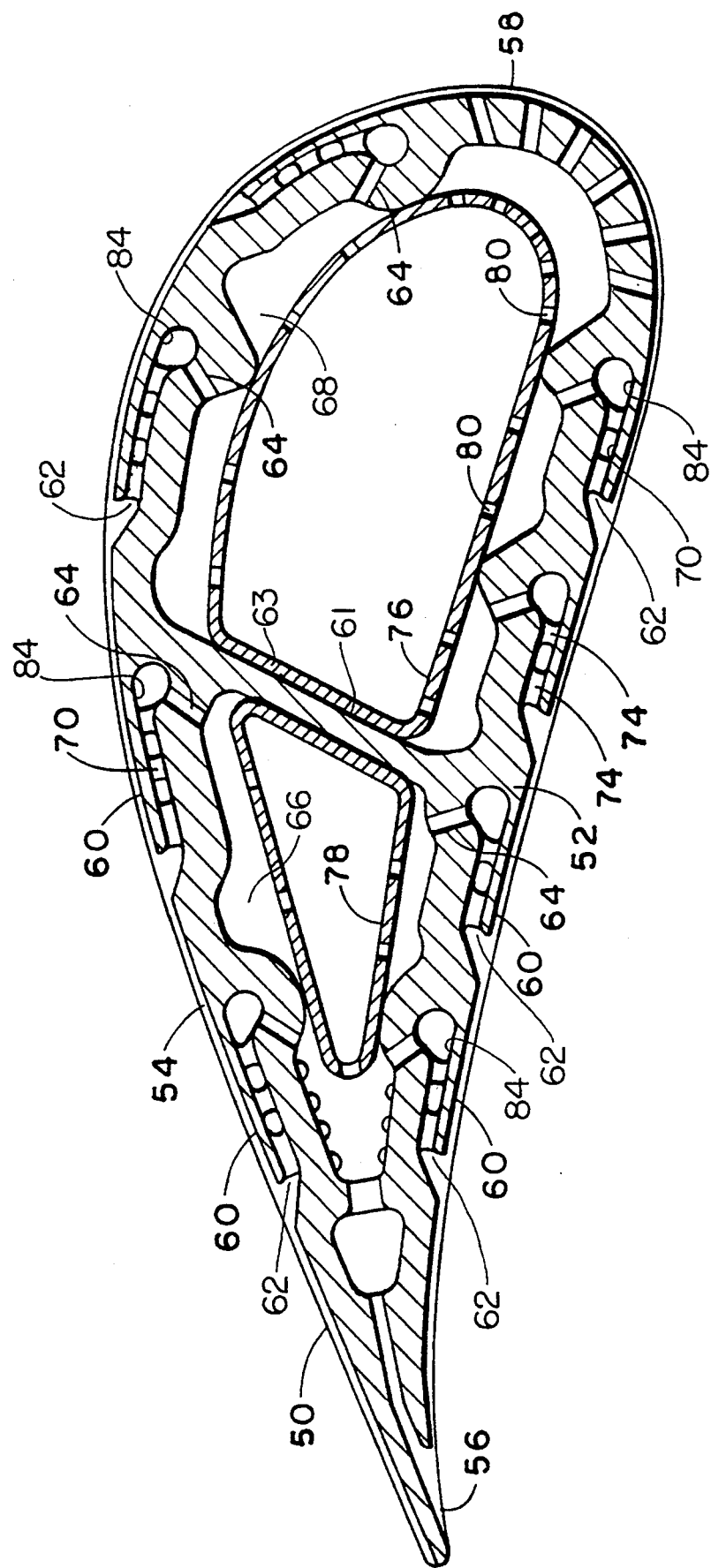
FIG. 3 is a sectional view of a vane made in accordance with this invention showing the details thereof.
Figure 4:
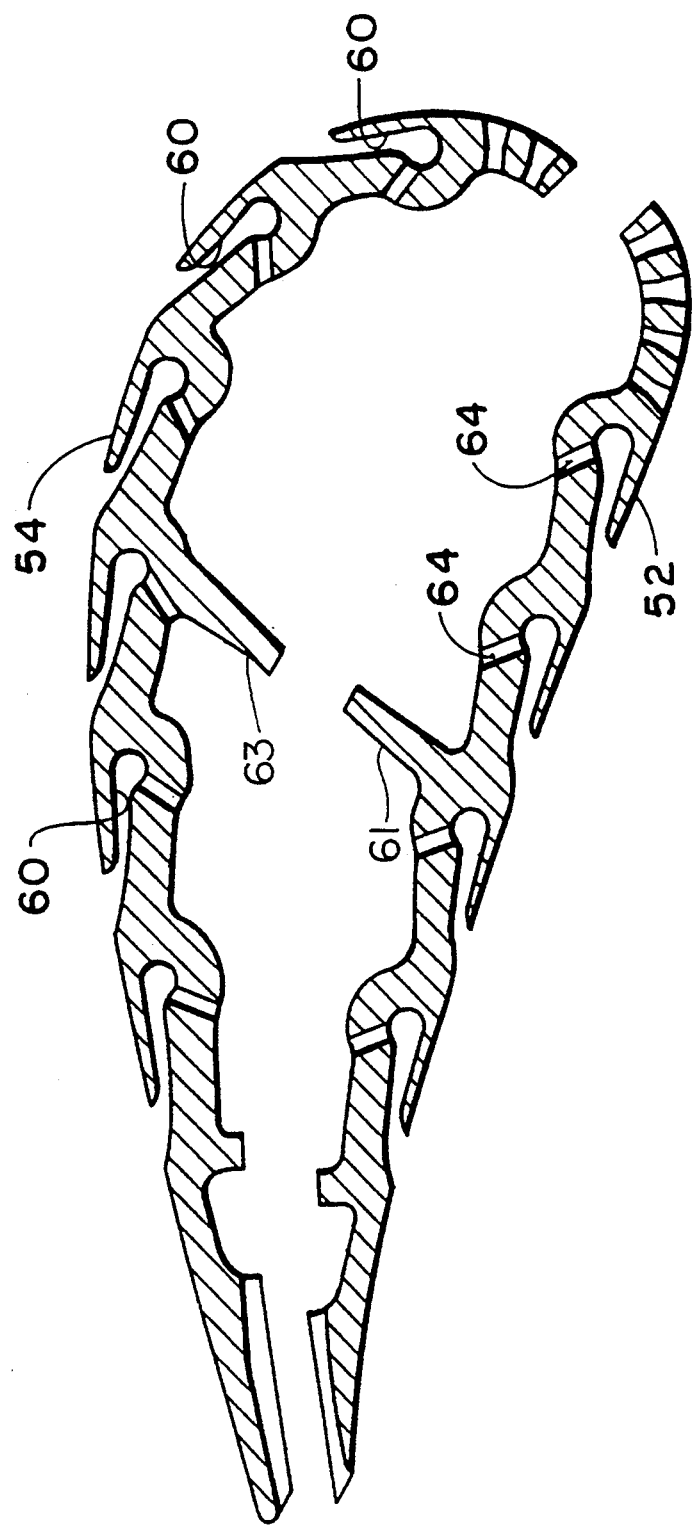
FIG. 4 is a sectional view of the inventive vane disclosing one of the steps in manufacturing.

The preferred embodiment is shown in FIGS. 3, 4, 5 and 6 which basically is a fully cast vane divided into three distinct regions, namely, the leading edge, the trailing edge and the side wall panels. The fully cast vane 50 is comprised of the pressure side wall 52, the suction side wall 54, the trailing edge 56 and the leading edge 58. The vane may be cast in two halves as shown in FIG. 4 and bonded together by any suitable means, such as by transient liquid phase which is a well known joining process and then brazed to the platform in a precision die, also a Well known technique. The ends of rib portions 61 and 63 extending inwardly mate when assembled to form a structural rib to prevent the vane from bulging due to the aerodynamic and pressure loads. Each side wall, i.e. the pressure side wall 52 and suction side wall 54, are cast with a plurality of pockets 60 (see FIG. 5) that are judiciously located adjacent the outer surface. A metering slot 62 is formed at the end of each pocket for exiting film air adjacent the outer surface of the side walls. A plurality of holes 64 are drilled internally of the pocket and communicate with the central passages 66 and 68 formed in the vane. The holes 64 are judiciously located so that cooling air impinges on the back side of the pressure side wall 52 and suction side wall 54, turns and flows toward the trailing edge in the mini passage 70 and exits out of metering slot 62 and effectively produce a film of cooling air. Each pocket may include a pedestal or pedestals 74 consistent with each application to enhance heat transfer. As noted in FIG. 5, each row of pockets 60 is arranged so that alternate rows are staggered. As noted, the upper row of pockets is slightly displaced relative to the lower row of pockets, assuring that a solid sheet of film cooling air is distributed over the airfoil surface.

The fully cast vane 50 may include inserts or impingement tubes 76 and 78 similar to the impingement tubes shown in the prior art (FIGS. 1 and 2). A plurality of holes 80 in the walls of the impingement tubes 76 and 78 serve to feed the side wall holes 64 of the pockets with the cooling air from the compressor section (not shown).

Figure 6:
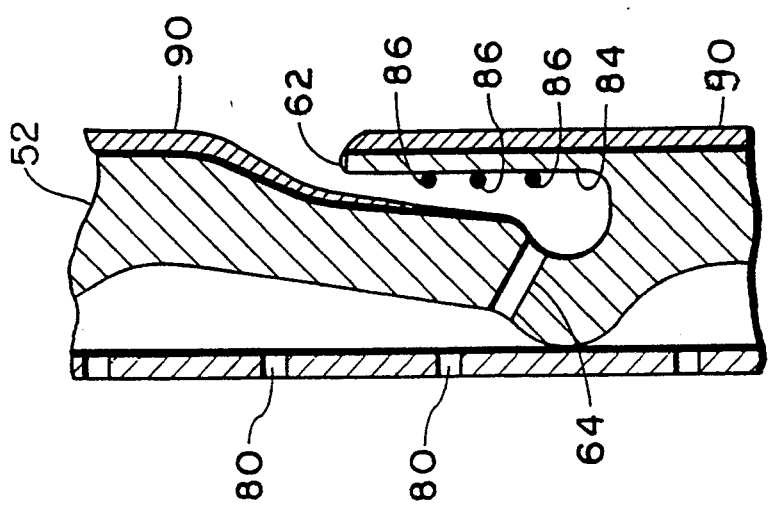
FIG. 6 is a partial view of an enlarged section of one of the pockets in FIG. 5.

As shown in FIG. 6 cool air from the impingement tube flows through holes 80 to impinge on the back surfaces of the pressure side wall 52 effectuating impingement cooling and convection. The air then flows into the holes 64 to impinge on each side of the wall 84 defining the pocket 60 to likewise maximize cooling effectiveness. The air then turns and flows leftwardly as viewed in FIG. 6 which is in the direction of the trailing edge and then out of metering slot 62 for laying a film of cool air adjacent the outer surface of the side wall.

By virtue of this invention not only is the convection process maximized, it is also possible to attain a maximum coverage of film cooling air downstream of the metering slot that extends over the surface of the airfoil. Conventional trip strips 86 may be included on the back side of the slot trailing edge to enhance heat transfer if so desired.

In this design, as seen in FIG. 3 the leading edge 58 and trailing edge 56 are cooled utilizing conventional technique although in certain embodiments as will be understood from the description to follow, the side walls are fed with cool air directly from the central passage in the vane.

The airfoil section of the fully cast vane 50 as noted in FIG. 6 can be coated with a thermal barrier coating (TBC) similar to that used on the prior art vane as shown by the overlay 90. Since the exit slot flow area is several times larger than the metering holes, the metered slots with the coating process are tolerant to TBC use. The TBC build-up closes the slots but not enough to shift the metering from the internal holes. Since the flow of cooling air is not affected by the TBC, the coating process doesn't adversely affect the film cooling. In particular, when TBC is a design feature, the exit slots are oversized such that the application of the TBC coats down the exit slots for an optimum area ratio of the exit slots to the metering holes, hence, the coolant to gas velocity ratio and film cooling effectiveness are optimized.

FIGS. 7, 8, 9, 10, 11 and 12 exemplify vanes incorporating this invention that are fabricated from a partially cast process and stamped sheet metal sheaths defining the side wall airfoil section. Similar to the fully cast vane construction, the embodiments depicted in FIGS. 7 and 9 which are fabricated with a single and double liner layer configuration, divide the cooling into three distinct regions; namely the leading edge, the trailing edge and the sidewall panels. Also, similarly these configurations combine backside impingement cooling, convection, surface liner backside impingement and a diffusing channel or metering slot discharging the coolant into the airfoil boundary layer with an optimum blowing parameter.

Figure 7:
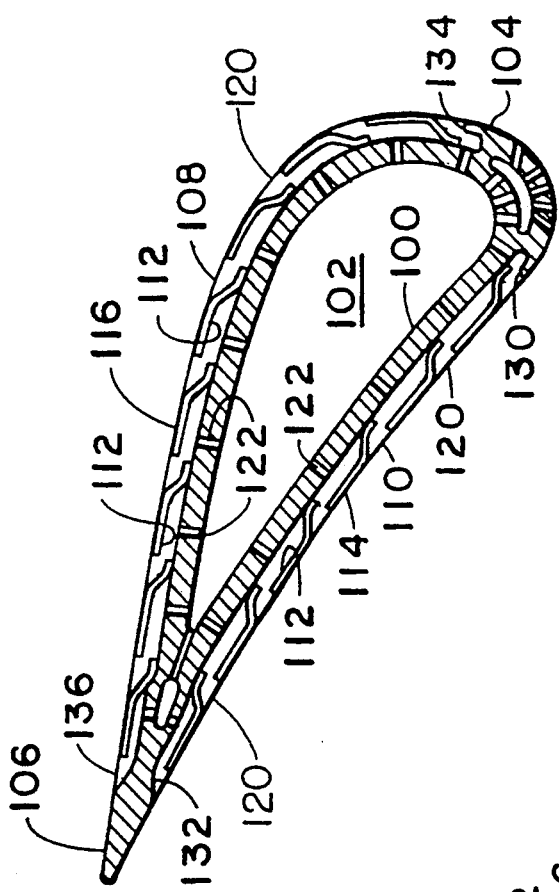
FIG. 7 is a sectional view of the airfoil section depicting another embodiment of a vane incorporating this invention.
Figure 9:
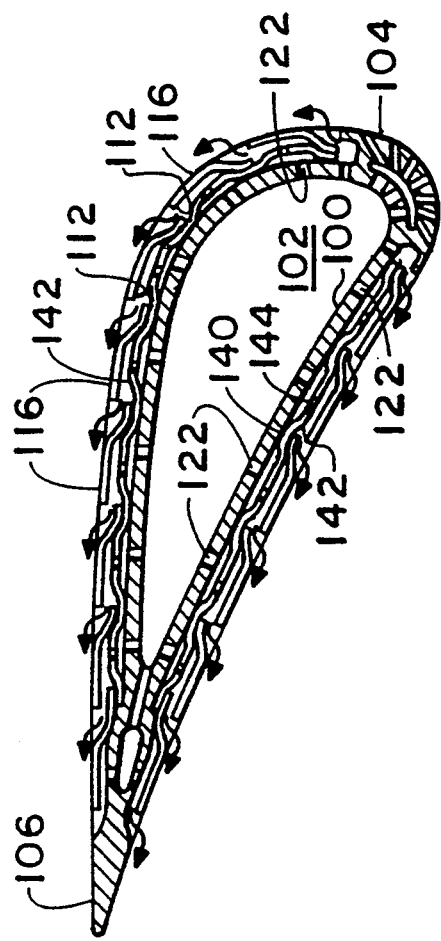
FIG. 9 is a sectional view of another embodiment of a vane employing this invention.

In the single layer embodiment depicted in FIG. 7, the inner shell 100 which is a structural member is formed in a hollow body defining the central passageway 102 and the shape of the airfoil section. The leading edge 104 with conventional cooling techniques are cast in the shell same is true for the trailing edge 106 which also employs conventional cooling techniques. The shell includes a plurality of impingement holes 122 that flow cooling air from the central passageway 102 which, similar to the vanes described above, is in communication with engine's compressor air (not shown) exposed to the inner and outer diameter of the vane through the platforms (see FIG. 12, one being shown). These platforms used for attaching the vanes to the engine's inner cases are cast on the inner and outer diameter of the shell. The outer liner layers defining the outer surface of the airfoil section is stamp formed out of sheet metal and is contiguous to the outer surfaces of the shell. The sheet metal has stamp formed therein a plurality of shaped dimples defining pockets 112 extending over a portion of the surface of the side walls 108 on both the pressure side 114 and suction side 116. Pockets 112 terminate in a slot 120 that is dimensioned to meter cooling flow to provide an optimum blowing parameter and obtain an optimized film of cooling air that flows adjacent the surface of the airfoil. The drilled holes 122 formed in the shell lead cooling air from the central passageway 102 to impinge on the backside of the trailing edge of the metered slot 120 in pocket 112 to effectuate impingement cooling and optimize convection as the cool air flows through the pocket to the metered slot 120.

In assembly as best seen in FIGS. 7, 11 and 12 the stamped sheet metal liners defining the pressure surface and suction surface are dimensioned to fit into the recess formed between the leading edge 104 and trailing edge 106 adjacent the radial lips 130 and 132 respectively, on the pressure side and 134 and 136 respectively on the suction side. And the inner and outer diameter of the pressure and suction airfoil section fit into and are trapped in slots 137 and 138 respectively-formed on both of the platforms (one being shown) (see FIG. 12).

Figure 8:
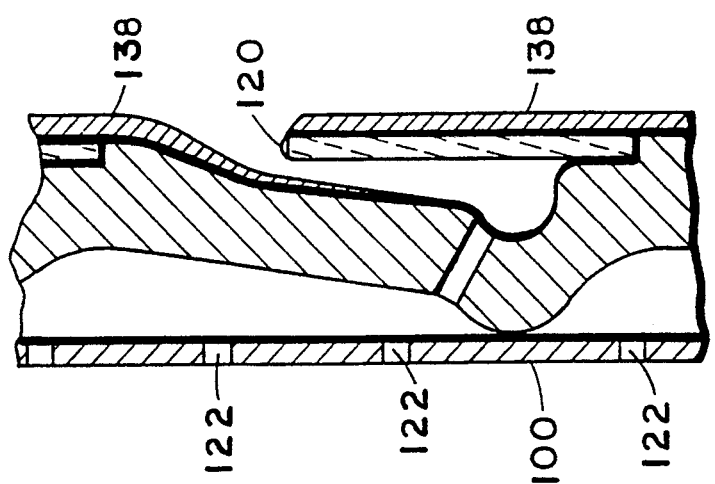
FIG. 8 is a partial view of an enlarged section of the stamped sheet metal including the pocket in FIG. 7.
Figure 10:
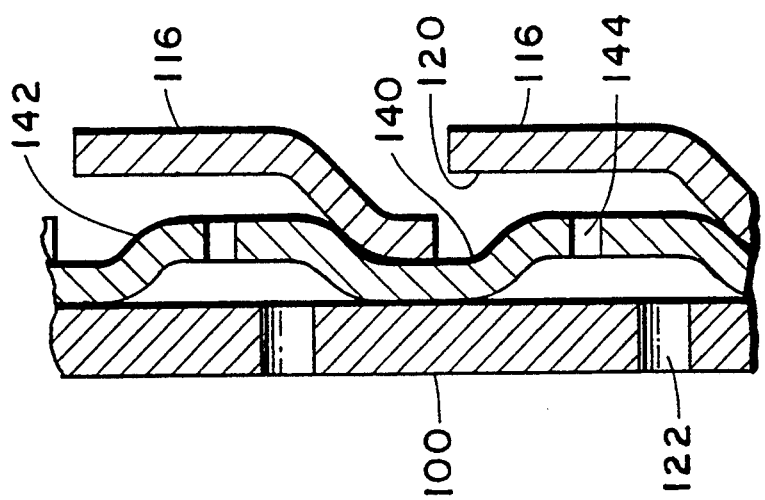
FIG. 10 is a partial view of an enlarged section of the stamped sheet metal sheath including the pocket in FIG. 9.

As shown in FIG. 8 the layer defined by the stamp formed sheet metal for the pressure side 114 and suction side 116 may be coated as in the prior art construction by a suitable thermal barrier coating and like the fully cast vane described above because the slot and holes are significantly large the coating does not adversely affect the cooling aspects.

FIGS. 9, 10, 11 and 12 disclose a multi-layer configuration similar to the construction described in connection with the FIG. 7 embodiment. For the sake of convenience like reference numerals will designate similar components in each of the embodiments. The outer liner layer 114 and 116 are configured similar to the outer liner layer of the single layer embodiment as is the inner structural shell 100. In this embodiment an intermediate liner layer 140 is stamp formed out of sheet metal with a dimple 142 that is complementary to the dimple in the outer liner layer and directs cooling air through holes 144 to impinge on the backside of the outer liner layer.

The assembly procedure for assembling the multi-layer design is similar to the assembly of the single liner layer design depicted in FIG. 7.

Both the single and multi-layer sheet metal designs permit the use of dissimilar material for the liner layers and shell. This allows the designer a great latitude in the selection of materials such that high temperature resistant but low strength material (such as wrought materials) can be used for the outer liner layer and a high strength low temperature resistant material can be used for the inner shell. These designs also lend themselves for simplified and less costly repair and replacement practices. Namely, a liner malfunction can be repaired by simply replacing the liner rather than the entire vane, as the heretofore practice would be for certain impairments.

Although this invention has been shown and described with respect to detailed embodiments thereof, it will be understood by those skilled in the art that various changes in form and detail thereof may be made without departing from the spirit and scope of the claimed invention.

We claim:

1. The method of manufacturing an air cooled stator vane for a gas turbine engine including the steps of:
    casting a first half of an outer shell shaped in an airfoil with an outer curvature defining a leading edge, a trailing edge and a suction surface;
    forming in the step of casting the first half a plurality of spaced pockets in the outer shell in rows extending over the suction surface of the shell and forming slots with a slot being located at the end of each pocket and passages in the outer shell with each passage for each pocket extending in the direction of the leading edge from the trailing edge connecting with each of the slots;
    forming in the step of casting the first half a mating face at the leading edge and a mating face at the trailing edge;
    casting a second half of the outer shell shaped in an airfoil complementing the first half for forming the stator vane with an outer curvature defining a leading edge, a trailing edge and a pressure surface;
    forming in the step of casting the second half a plurality of pockets in the outer shell in rows extending over the pressure surface and forming slots with a slot being located at the end of each pocket and passages in the outer shell with each passage for each pocket extending in the direction of the leading edge from the trailing edge connecting with each slot;

forming in the step of casting the second half a mating surface at the leading edge and a mating surface at the trailing edge;

machining apertures through the cast outer shell from the interior of the outer shell so that each aperture is formed in a portion of the outer shell and extends from the interior of the outer shell to the pocket at a point remote from the slot; and joining said halves of airfoil shaped outer shells at the respective mating surfaces.

2. The steps of manufacturing as claimed in claim 1 including the step of forming in the steps of casting the first half and the second half of the outer shell axially extending ribs on the underside of the pressure surface and the underside of the suction surface with each rib having complementary mating surfaces and joining in the step of joining the respective mating surfaces.

3. The steps of manufacturing as claimed in claim 2 including the step of forming from a sheet metal blank a pair of impingement tube inserts complementing the space within the shell adjacent each side of the joined rib and inserting said inserts into the respective spaces.

4. The steps of manufacturing as claimed in claim 3 including the step of coating the outer shell with a thermal barrier coating material.

* * * * *